US008984009B2

United States Patent
Fee et al.

(10) Patent No.: US 8,984,009 B2
(45) Date of Patent: Mar. 17, 2015

(54) METHODS AND SYSTEMS FOR UTILIZING BYTECODE IN AN ON-DEMAND SERVICE ENVIRONMENT INCLUDING PROVIDING MULTI-TENANT RUNTIME ENVIRONMENTS AND SYSTEMS

(75) Inventors: Gregory D. Fee, Seattle, WA (US); William J. Gallagher, Howard, PA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 13/091,353

(22) Filed: Apr. 21, 2011

(65) Prior Publication Data

US 2011/0264861 A1    Oct. 27, 2011

Related U.S. Application Data

(60) Provisional application No. 61/326,385, filed on Apr. 21, 2010, provisional application No. 61/326,368, filed on Apr. 21, 2010, provisional application No. 61/326,377, filed on Apr. 21, 2010.

(51) Int. Cl.
| | |
|---|---|
| *G06F 17/30* | (2006.01) |
| *G06F 7/00* | (2006.01) |
| *G06F 9/50* | (2006.01) |
| *G06F 12/08* | (2006.01) |

(52) U.S. Cl.
CPC ........ *G06F 9/5027* (2013.01); *G06F 17/30132* (2013.01); *G06F 12/0866* (2013.01); *G06F 2212/465* (2013.01); *G06F 2209/549* (2013.01)
USPC ............................ 707/783; 707/788; 707/796

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |

(Continued)

*Primary Examiner* — Taelor Kim
*Assistant Examiner* — David T Brooks
(74) *Attorney, Agent, or Firm* — Blakely Sokoloff Taylor & Zafman

(57) ABSTRACT

Execution of code in a multitenant runtime environment. A request to execute code corresponding to a tenant identifier (ID) is received in a multitenant environment. The multitenant database stores data for multiple client entities each identified by a tenant ID having one of one or more users associated with the tenant ID. Users of each of multiple client entities can only access data identified by a tenant ID associated with the respective client entity. The multitenant database is a hosted database provided by an entity separate from the client entities, and provides on-demand database service to the client entities. Source code corresponding to the code to be executed is retrieved from a multitenant database. The retrieved source code is compiled. The compiled code is executed in the multitenant runtime environment. The memory used by the compiled code is freed in response to completion of the execution of the compiled code.

24 Claims, 8 Drawing Sheets

(56) References Cited

U.S. PATENT DOCUMENTS

| | | |
|---|---|---|
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,718,540 B1 * | 4/2004 | Azua et al. ............ 717/148 |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0086479 A1 * | 4/2008 | Fry et al. ............ 707/10 |
| 2010/0030745 A1 * | 2/2010 | Adler ............ 707/3 |
| 2010/0042585 A1 * | 2/2010 | Adler ............ 707/3 |
| 2010/0070516 A1 * | 3/2010 | Adler ............ 707/758 |
| 2010/0095284 A1 * | 4/2010 | Herring et al. ............ 717/148 |

* cited by examiner

```
public interface InterpretableClass {
    // Fully qualified type name
    public String getClassName();
    // The modifiers on this class, same format as
modifiers in java so you can use the Modifiers class to
interpret the returned value
    public int getModifiers();

public int getReferenceSize();
    public int getInstanceSize(ExecutionContext context)
throws InterpreterRuntimeException;

public Object getDefaultValue();

public List<InterpretableField>
getInstanceFields(ExecutionContext context) throws
ClassLoadRequiredException, InterpreterRuntimeException;
    public List<InterpretableField> getDeclaredFields()
throws ClassLoadRequiredException,
InterpreterRuntimeException;

public FieldRef
getNormalizedStaticFieldRef(ExecutionContext context,
FieldRef fieldRef) throws ClassLoadRequiredException,
InterpreterRuntimeException;
    public Object getStaticField(ExecutionContext context,
FieldRef fieldRef) throws InterpreterRuntimeException;
    void putStaticField(ExecutionContext context, FieldRef
fieldRef, Object value) throws InterpreterRuntimeException;

public List<InterpretableMethod>
getVirtualMethodTable(ExecutionContext context) throws
ClassLoadRequiredException, InterpreterRuntimeException;
    public InterpretableMethod
resolveVirtualMethodRef(ExecutionContext context, MethodRef
methodRef) throws ClassLoadRequiredException,
InterpreterRuntimeException;
```

FIG. 3A

```
// 'Methods' includes methods, constructors, and static
initializers, basically all executable code
    public List<InterpretableMethod> getDeclaredMethods()
throws ClassLoadRequiredException,
InterpreterRuntimeException;

public TypeRef getParent() throws
InterpreterRuntimeException;
    public List<TypeRef> getInterfaces() throws
InterpreterRuntimeException;

// Returns an uninitialized object of this type
    public ObjectInstance
createNewObjectInstance(ExecutionContext context) throws
ClassLoadRequiredException, InterpreterRuntimeException;

public ExecutionFrame
createStaticInitializerFrame(ExecutionContext context);

// Return a hint to the loader of classes that this
class may need loaded before it can execute fully.
    // The result here cannot affect overall execution
correctness, but it can affect performance
    public List<TypeRef> getLoaderHint();

public Object convertToJava(ExecutionContext context,
Object interpreterObject) throws
InterpreterRuntimeException;
    public Object convertToInterpretable(ExecutionContext
context, Object javaObject) throws
ClassLoadRequiredException, InterpreterRuntimeException;

```
public interface ObjectInstance {
    public int getSize(ExecutionContext context) throws
InterpreterRuntimeException;
    public InterpretableClass getInterpretableClass();

public Object getField(ExecutionContext context, FieldRef fieldRef) throws
InterpreterRuntimeException;
    public void putField(ExecutionContext context, FieldRef fieldRef, Object value)
throws InterpreterRuntimeException;

// This list must be empty or modifiable (and it will be modified)
    public List<ObjectInstance> getReferencedObjects(ExecutionContext context);
}
```

FIG. 4

METHODS AND SYSTEMS FOR UTILIZING BYTECODE IN AN ON-DEMAND SERVICE ENVIRONMENT INCLUDING PROVIDING MULTI-TENANT RUNTIME ENVIRONMENTS AND SYSTEMS

CLAIM OF PRIORITY

This application claims the benefit of U.S. Provisional Patent Application 61/326,368 entitled METHODS AND SYSTEMS FOR EVALUATING BYTECODE IN AN ON-DEMAND SERVICE ENVIRONMENT INCLUDING EFFICIENT UTILIZATION OF SHARED RESOURCES AND GOVERNOR LIMIT ENFORCEMENT, by Gregory D. Fee and William J. Gallagher, filed Apr. 21, 2010, the entire contents of which are incorporated herein by reference.

This application claims the benefit of U.S. Provisional Patent Application 61/326,377 entitled METHODS AND SYSTEMS FOR EVALUATING BYTECODE IN AN ON-DEMAND SERVICE ENVIRONMENT INCLUDING TRANSLATION OF APEX TO BYTECODE, by Gregory D. Fee and William J. Gallagher, filed Apr. 21, 2010, the entire contents of which are incorporated herein by reference.

This application claims the benefit of U.S. Provisional Patent Application 61/326,385 entitled METHODS AND SYSTEMS FOR EVALUATING BYTECODE IN AN ON-DEMAND SERVICE ENVIRONMENT INCLUDING PROVIDING A MULTI-TENANT, MULTI-LANGUAGE RUNTIME ENVIRONMENTS AND SYSTEMS, by Gregory D. Fee and William J. Gallagher, filed Apr. 21, 2010, the entire contents of which are incorporated herein by reference.

CROSS REFERENCE TO RELATED APPLICATIONS

The following commonly owned, co-pending United States patents and patent applications, including the present application, are related to each other. Each of the other patents/applications are incorporated by reference herein in its entirety:

U.S. patent application Ser. No. 13/091,347, by Gregory D. Fee and William J. Gallagher, filed Apr. 21, 2011; and U.S. patent application Ser. No. 13/091,335, by Gregory D. Fee and William J. Gallagher, filed Apr. 21, 2011.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

Embodiments described herein relate generally to evaluation of bytecode in a database network system. More particularly, embodiments relate to efficient utilization of shared resources for evaluation of bytecode.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized. The subject matter in the background section merely represents different approaches.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

As an on demand platform, Apex™ provides a set of features for building business applications including, for example, data models and objects to manage data, a workflow engine for managing collaboration of that data, a user interface model to handle forms and other interactions, and a Web services application programming interface (API) for programmatic access and integration. These platform technologies support custom applications and integrations, and allow developers to build applications utilizing this on demand model.

Apex code is "on demand," running without requiring local servers or software. Apex code may run in a multi-tenant environment, providing the economic and manageability benefits of a shared service while keeping the definition, data and behavior of each customer's application separate from each other. For developers, the combination of these capabilities with this on-demand, multi-tenant delivery provides convenience, scalability, and safety of an on-demand database, combined with the flexibility and control of a procedural language.

Apex code provides a powerful and productive approach to creating functionality and logic, allowing developers to focus on elements specific to their application, while leaving other elements to the platform's framework. Apex code is a successful and innovative language in part because of its multi-tenant design. Multitenancy allows Apex to scale to a large number of customers with a relatively modest hardware investment. Apex code is abstracted and governed, utilizing only as many resources as is allowed.

Performance is a key requirement for any programming language. It is especially important in a multitenant environment where processor cycles spent interpreting code for a given customer have a direct and negative impact on other customers sharing the same environment. Thus, improving performance not only results in quicker response times for users but also less impact on other tenants in terms of the overall load on the system.

All languages tend to have some start-up cost associated with getting code into a state where it can be executed. This cost includes, for example, the processing required to load the executable form of the code and to link it with dependent code. Unlike most programming languages, however, start-up costs tend to dominate in a multi-tenant language where the interpreter may be called upon to execute code from any one of possibly thousands of tenants. The ability to cache executable code to avoid the start-up costs on subsequent requests is limited by the large working set. In addition, the requests tend to be relatively short, making the start-up cost a larger proportion of the overall request time.

BRIEF DESCRIPTION OF THE DRAWINGS

In the following drawings like reference numbers are used to refer to like elements. Although the following figures

FIGS. 3a and 3b provide one embodiment of an InterpretableClass interface that may be utilized;

FIG. 4 provides one embodiment of an ObjectInstance interface that may be utilized;

DETAILED DESCRIPTION

In the following description, numerous specific details are set forth. However, embodiments may be practiced without these specific details. In other instances, well-known circuits, structures and techniques have not been shown in detail in order not to obscure the understanding of this description.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

In one embodiment, a multi-tenant database system utilizes tenant identifiers (IDs) within a multi-tenant environment to allow individual tenants to access their data while preserving the integrity of other tenant's data. In one embodiment, the multitenant database stores data for multiple client entities each identified by a tenant ID having one of one or more users associated with the tenant ID. Users of each of multiple client entities can only access data identified by a tenant ID associated with their respective client entity. In one embodiment, the multitenant database is a hosted database provided by an entity separate from the client entities, and provides on-demand and/or real-time database service to the client entities.

As used herein, the term bytecode refers to various forms of instruction sets to be executed by a software interpreter. Bytecode instructions are also suitable for further compilation into machine code. Bytecode instructions are processed by software, but have similarities to hardware instructions. Virtual stack machines are common execution environments. A bytecode program may be executed by parsing instructions and directly executing the instructions, one at a time. Some systems, called dynamic translators, or "just-in-time" (JIT) compilers, translate bytecode into machine language as necessary at runtime.

Figure 1:
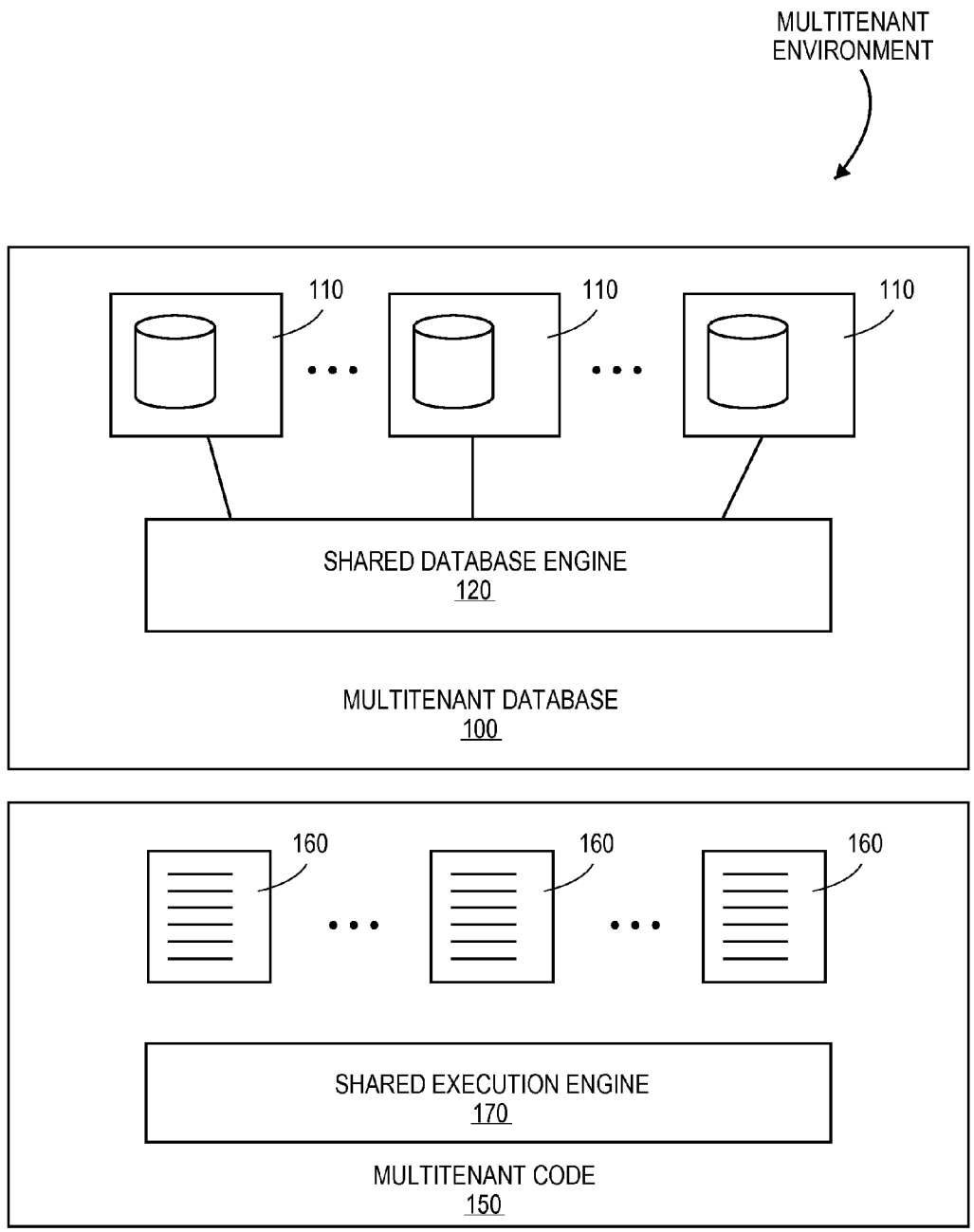
FIG. 1 is a block diagram of one embodiment of a multi-tenant environment.

FIG. 1 is a block diagram of one embodiment of a multi-tenant environment. The multitenant environment includes multitenant database 100, which includes multiple tenant data sets 110 corresponding to the tenants of the multitenant environment. In one embodiment, each tenant has a unique tenant ID that is utilized to control access to the multitenant environment. In one embodiment, multitenant database 100 stores data for multiple client entities each identified by a tenant ID having one of one or more users associated with the tenant ID.

The users of each of the multiple client entities can only access data identified by a tenant ID associated with the respective client entity. In one embodiment, multitenant database 100 is a hosted database provided by an entity separate from the client entities, and provides on-demand database service to the client entities. Multitenant database 100 further includes shared database engine 120 that provides the functionality of multitenant database 100 in operating on tenant data sets 110.

The multitenant environment further includes multitenant code 150, which includes multiple tenant logic sets 160 corresponding to the tenants of the multitenant environment. In one embodiment, multitenant code 150 includes code for multiple client entities each identified by the corresponding tenant IDs. The users of each of the multiple client entities can only access code identified by the tenant ID associated with the respective client entity. In one embodiment, multitenant code 150 is stored in a hosted database provided by an entity separate from the client entities, and provides on-demand database service to the client entities. Multitenant code 150 further includes shared execution engine 170 that provides the ability to execute code represented by multitenant code 150. In one embodiment, shared execution engine 170 is a virtual machine.

Figure 2:
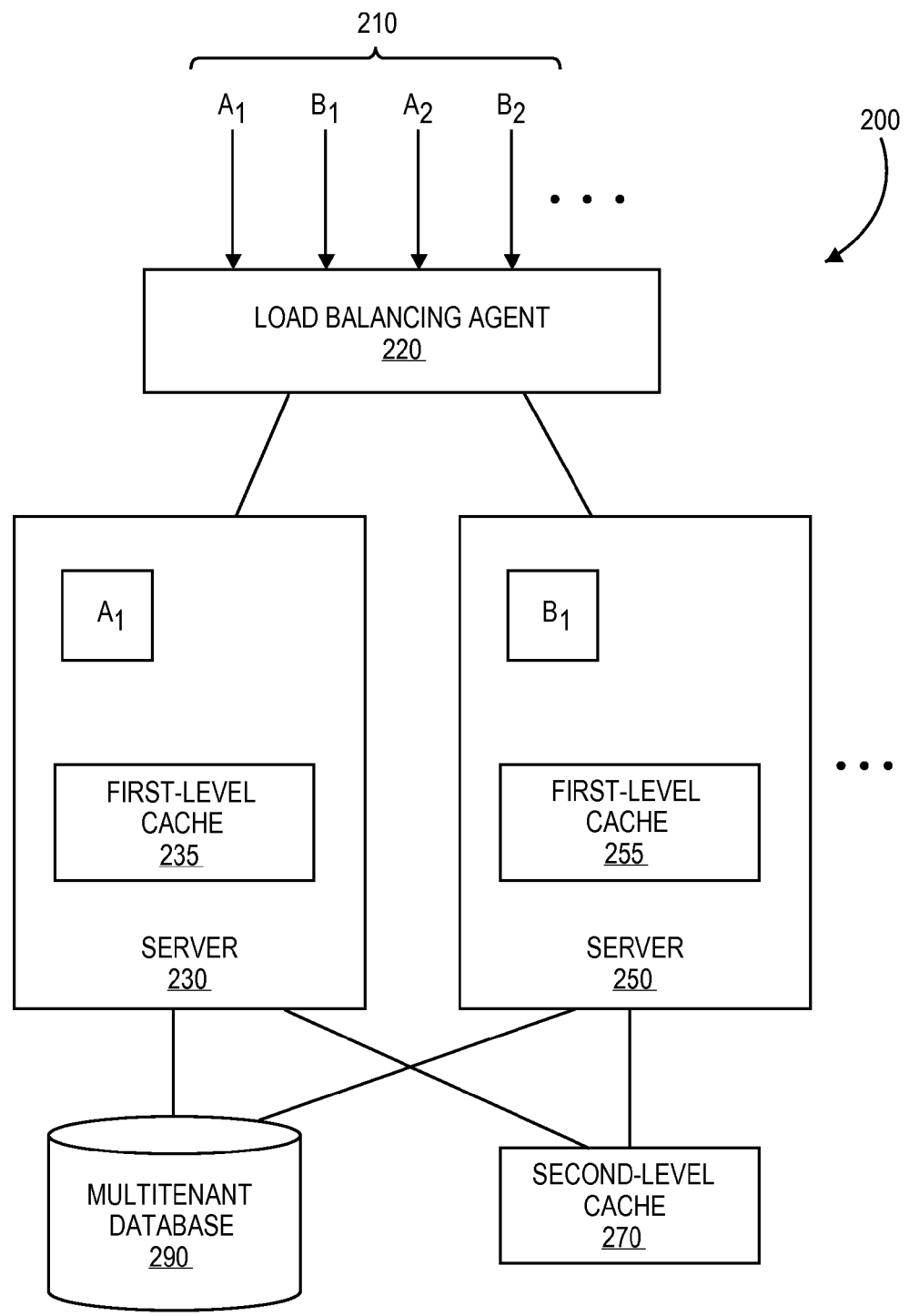
FIG. 2 is a block diagram of one embodiment of an architecture that may be utilized to provide a pod in a multitenant environment.

FIG. 2 is a block diagram of one embodiment of an architecture that may be utilized to provide a pod in a multitenant environment. The example of FIG. 2 is limited to a single pod and four requests for reasons of simplicity of description only. Any number of pods, any number of requests, any number of databases, and/or any number of servers, can be supported.

In one embodiment, pod 200 may be configured to receive multiple requests 210. Pod 200 represents a group of servers, or resources, that may be shared to satisfy requests received by pod 200. A multitenant environment may include any number of pods. Pod 200 receives requests (e.g., $A_1$, $B_1$, $A_2$, $B_2$) through load balancing agent 220. In one embodiment, load balancing agent 220 provides request allocations based on a round robin strategy. The round robin strategy will be described in greater detail below. In alternate embodiments, other load balancing strategies can be utilized.

When load balancing agent 220 receives a request (e.g., $A_1$), the request is assigned to a server (e.g., 230, 250). The assigned server (e.g., 230) retrieves the appropriate source code from shared database 290. Server 250 can include first-level cache 255. In one embodiment, the source code is Apex code; however, other types of source code can also be supported.

Server 230 then compiles the retrieved source code to generate executable code. In one embodiment, the source code is translated to bytecode. Server 230 then executes the compiled code to service the request (e.g., The load balancing service is usually provided by a dedicated program or hardware device (such as a multilayer switch or a DNS server). In one embodiment, the executable code and/or the byte code may be parsed to find a selected portion of code to be executed to avoid execution of extra code.

In one embodiment, upon completion of the execution of the code, the memory used to store the executable code is freed. That is, the compiled code is not preserved in memory after execution of the code. In one embodiment, the compiled code may be copied to first level cache 235 upon completion of the execution. The compiled code can also be copied from the first level cache memory to a second level cache memory 270. In an embodiment where a first level cache is utilized, the server may check the first level cache before retrieving code from multitenant database 290.

For a subsequent request (B₁), load balancing agent 220 receives the request and assigns it to the next server (assuming a round robin strategy), where server 250 retrieves code from multitenant database 290, compiles the code, executes the code and frees the memory used by the code as described above with respect to the first request (i.e., B₁). Further subsequent requests, 210, (e.g., A₂, B₂) are handled in a similar manner.

In one embodiment, Apex is implemented as an Abstract Syntax Tree (AST)-based interpreter. Most compilers parse source code into an intermediate AST form. An AST interpreter executes directly on the generated AST in order to interpret the code. A full source code parse is required to compute the AST. Thus, parsing the Apex source code is expensive.

To reduce this parsing cost, the Apex runtime caches the generated AST in memcached. The term "memcached" refers to a general-purpose distributed memory caching system often used to speed up dynamic database-driven applications or websites by caching data and objects in system memory to reduce the number of times an external data source (such as a database or API) must be read. Memcached runs on Unix, Windows and MacOS.

Storage of the AST in memcached requires the AST to be serialized into a byte stream. The AST is comprised of a set of nodes, each representing some construct in the source code (e.g., a while loop, an add expression, etc.). The set of nodes can become fairly large, for example, it can be approximately 10.5 times the source code size in terms of heap consumption. In addition, this size consists of a very large number of very small Java™ or other bytecode objects. Unfortunately, very large object graphs are expensive to serialize using Java serialization techniques. Deserializing the AST from memcached is the dominant cost in many Apex requests. Java is a trademark of Sun Microsystems.

In one embodiment, the Apex interpreter serves as a level of isolation between customer code and the host virtual machine (VM). The Apex interpreter may enforce governor limits and brokers requests to the underlying platform on behalf of customer code. In one embodiment, the Apex interpreter is not a full-fledged Java virtual machine. The Apex interpeter may delegate to a Java virtual machine (JVM) for various services. Garbage collection is an example of this. In one embodiment, the Apex interpreter is also able to delegate to the VM on a per type basis.

FIGS. 3a and 3b provide one embodiment of an InterpretableClass interface that may be utilized. In one embodiment, the interpreter uses an abstract representation of a type. In one embodiment, the representation is captured in an interface, InterpretableClass, that allows the interpreter to operate over multiple type representations without knowledge of the underlying implementation. This allows the interpreter to implement a relatively small set of generic functionality (e.g. type loading, method lookups) and pushes the details of how types load metadata and execute to concrete classes specific to that task. Further is allows separation of how different type representations interact with the interpreter enabling a type representation extensibility model.

In one embodiment, there are three "standard" implementations of InterpretableClass:

---

ByteCodeInterpretableClass,
JavaBackedInterpretableClass, and
ReflectionInterpretableClass.

---

ByteCodeInterpretableClass loads a bytecode class file into memory and understands how to interpret the bytecode instructions in method bodies.

The JavaBackedInterpretableClass allows method bodies of a type representation to easily interact with the interpreter. This allows the method implementations to use interpreter services directly, such as loading a type explicitly.

The ReflectionInterpetableClass acts as a proxy that exposes types loaded in the VM to the interpreter. This allows interoperation between types loaded in the interpreter and the VM. The type manages execution of methods by marshaling arguments into the VM, executing the method via reflection, and the marshaling the return value, if any, back into the interpreter.

One application of this type representation is as an escape mechanism for performance critical code allowing it to run directly in the VM. A possible longer term application is as the primary means of interoperation between the interpreter and a host environment.

FIG. 4 provides one embodiment of an ObjectInstance interface that may be utilized. In one embodiment, the interpreter also uses an abstract representation of object instances. This representation is captured in an interface, ObjectInstance, that allows the interpreter to operate over multiple object instance representations without knowledge of the underlying implementation. This allows the interpreter to implement a relatively small set of generic functionality (e.g. heap walking, virtual method lookups) and pushes the details of how types load metadata and execute to concrete classes specific to that task. Further, in combination with the InterpretableClass interface, this allows separation of how different type representations interact with the interpreter enabling a type representation extensibility model.

In one embodiment, there is a concrete implementation of ObjectInstance that corresponds to each implementation of InterpretableClass. For example, ByteCodeInterpretableClass has a corresponding ByteCodeObjectInstance.

In one embodiment, the interpreter, via the ByteCodeInterpretableClass, implements a full set of bytecode instructions. Instruction issuance may performed using, for example, a "switch" statement that has a case for all possible bytecode instructions. A loop may drive the execution of a code block and individual instructions may be able to terminate the loop as necessary (e.g., when the method returns).

The implementations of the instructions use the ObjectInstance and InterpretableClass interfaces allowing bytecode to manipulate any type loaded into the system transparently. The runtime call stack similarly takes advantage of the ObjectInstance/InterpretableClass abstraction to allow seamless method invocation into and out of bytecode. A small set of directives allows a method implementation to inform the stack of the manner in which it completed.

--- public enum FrameDirective {
    None,
    Pop,
    PopHasReturn,
    ExceptionThrown,
    Tailcall
}

---

None indicates that no stack action is necessary. This is the typical response if a method is yielding control to a method that it is invoking Pop causes the interpeter to pop the current frame from the stack. This is the typical response when a void method returns. PopHasReturn causes the interpeter to pop the current frame from the stack and push its return value into the local stack of the calling method. This is the typical response when a non-void method returns. ExceptionThrown causes the interpeter to indicate that the current method raised an exception. The system searches for appropriate filters to handle the exception and delivers control to the filter handlers appropriately. Tailcall causes the interpeter to replace the current method frame with a new method frame that has already been pushed on the stack.

In various embodiments, one or more optimizations may be applied to bytecode. The first optimization is to use stack windows instead of parameter passing for method invocation. This technique takes advantage of an interpretation semantic that passes the top "n" stack variables in the caller to become local variables in the callee's context. The stack window technique stores stack and local variables for multiple methods in a shared data structure. When a method invokes another, a window into the shared data structure is passed to the callee. This technique allows a long lived data structure, the shared stack and local variables, to hold most of the method invocation data which reduces the amount of memory garbage created and also increases the locality of data to better utilize processor caches.

The second optimization uses a "struct" to store stack and local variable data. In one embodiment, this struct has a 32-bit integer field and an object reference. The integer field holds data for all primitive types while the object field holds all reference types. This struct allows a single logical stack or local variable slot to hold all data types with a minimum of conversion required. Note that 64-bit primitives, double and long, still span two variables slots and may require manipulation to reform during interpretation.

Apex supports two distinct ways to execute a SOQL query: statically and dynamically. A static SOQL query is specified by inlining the query within the surrounding Apex code. The inline query supports binding arbitrary expressions to variables defined in the query. For example:

Account a=[select id, name from Account where name=: name];

Integrating the bytecode may make bytecode generation and interpretation a plugin replacement for the current tree-based model based on an organization permission.

In one embodiment, wall application programming interfaces (APIs) provide abstraction that allows transparently switching between the tree-based and bytecode runtimes. In one embodiment, a top-level wall construct, ApexEngine, encapsulates the logic to select the appropriate apex implementation for this organization and returns an ApexContext implementation that acts as a factory for subsequent wall calls in the request without the need to reevaluate the permission.

In one embodiment, objects returned by wall APIs are request specific. This means that caching objects returned by the wall across request boundaries is unsupported. In particular, if the organization permission controlling which runtime is used is changed between requests then errors can occur. For example, caching an ApexObjectType that represents Integer (or an entire method signature) in a static fields and then using it to perform comparisons against types found in method signatures will give incorrect results. Instead, the type or signature is loaded on a per request basis and then a comparison is performed.

In one embodiment, the integration of bytecode uses the three standard type representations discussed above. In one embodiment, user code as well as file based Apex may be represented using the ByteCodeInterpretableClass. In one embodiment, for Java™ runtime classes, some types are represented with ByteCodeInterpretableClass and some using ReflectionInterpretableClass. In one embodiment, Java runtime types are loaded as ReflectionInterpretableClass. In alternate embodiments, a whitelist may be created of types that are allowable for load with ReflectionInterpretableClass and all other types will be loaded using ByteCodeInterpretableClass.

In one embodiment, SObjectInterpretableClass is a projection of SObject entities into the interpreter. It exposes entity fields as fields on the class as well as the instance methods callable from Apex on SObjects. WrapperInterpretableClass projects Apex wrapper types (common.apex.runtime.impl.WrapperType) into the interpreter. This is a mapping of static and instance wrapper methods as class methods. WrapperTypes do not support fields. As the implementation of SObjects and WrapperTypes in the interpreter are not native, the interpreter may be required to marshal values from the interpreter to a form that these types understand.

In one embodiment, Apex utilizes serialization in two ways in the tree-based implementation. One way is to cache type definitions in the form of the AST generated by the parser for use in subsequent executions. The other is to serialize object graphs for use in subsequent requests. Bytecode affects both of these uses.

In one embodiment, the bytecode implementation is not required to serialize type definitions. This is replaced by storing the bytecode representation, which is a binary format, of the type definition. The bytecode implementation also allows serialization of object instances. This is functionally equivalent to the object instance serialization in the tree-based implementation. Tree-based object instances cannot be deserialized into an organization that is set to use bytecode.

In one embodiment, the bytecode implementation performs lazy linking. The interpreter attempts to delay loading and parsing of type information as late as is allowed within the relevant requirements. This allows the minimum amount of code to be loaded and parsed to execute a request. Additionally, the interpreter does not cache references to types internally allowing conversion of type information to garbage when a request completes. In one embodiment, the interpreter does not cache ApexObjectType (or anything that comes from it) beyond the lifetime of a single request.

In one embodiment, the interpreter implementation provides two new exception types. InterpreterRuntimeException signifies a fatal error in the interpreter itself. InterpreterExecutionException signifies a user exception during bytecode execution. These two types are handled by the wall implementation for bytecode so users need not deal with them directly.

Figure 5:
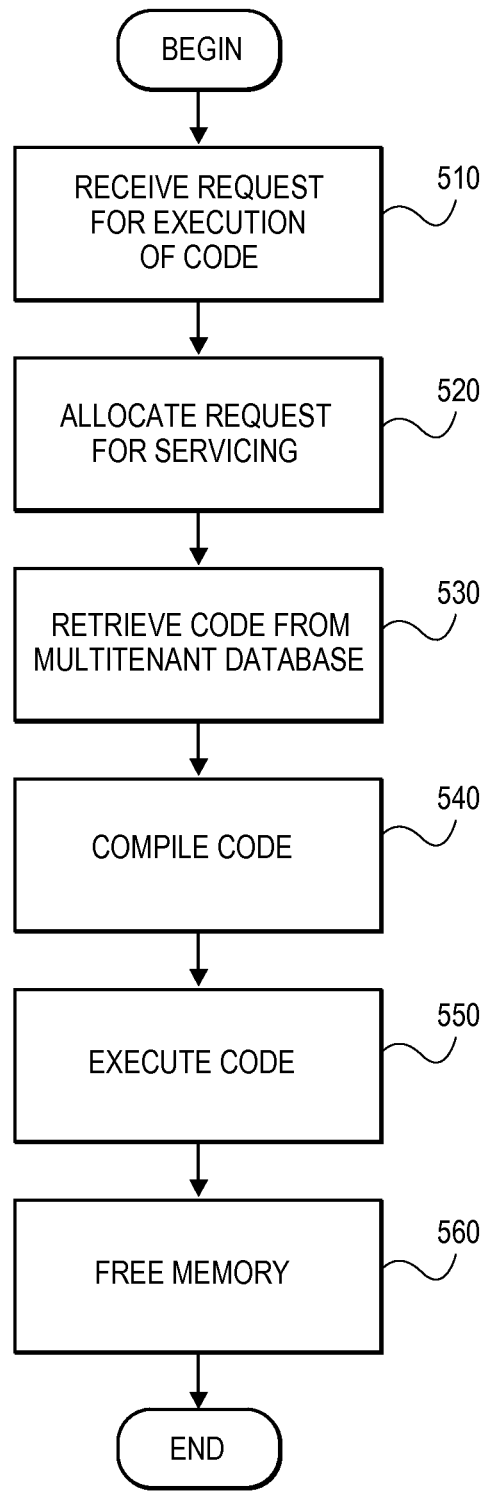
FIG. 5 is a flow diagram of one embodiment of a technique for executing code in a multitenant environment.

FIG. 5 is a flow diagram of one embodiment of a technique for executing code in a multitenant environment. As discussed above, the technique described with respect to FIG. 5 may be provided by components of a pod of servers, for example, as illustrated in FIG. 2.

A load balancing agent or other component receives a request that requires execution of tenant code in a multitenant environment, 510. The load balancing agent may be implemented as, for example, a dedicated program or hardware device such as a multilayer switch. In one embodiment, load balancing is implemented as a round robin strategy. That is, requests are assigned to servers in a sequential, circular manner. In alternate embodiments, other load balancing strategies may be utilized.

The load balancing agent allocates the request for servicing based on the load balancing strategy applied, 520. In one embodiment the load balancing agent is communicatively coupled to multiple servers or virtual machines that may be utilized to service the requests.

Source code corresponding to the request is retrieved from a multitenant database, 530. The retrieved source code is compiled, 540 and executed 550. In one embodiment, the source code is converted to bytecode to be executed by an interpreter on the server processing the request. In response to completion of the execution, the memory used to store the executable code is freed, 560.

Figure 6:
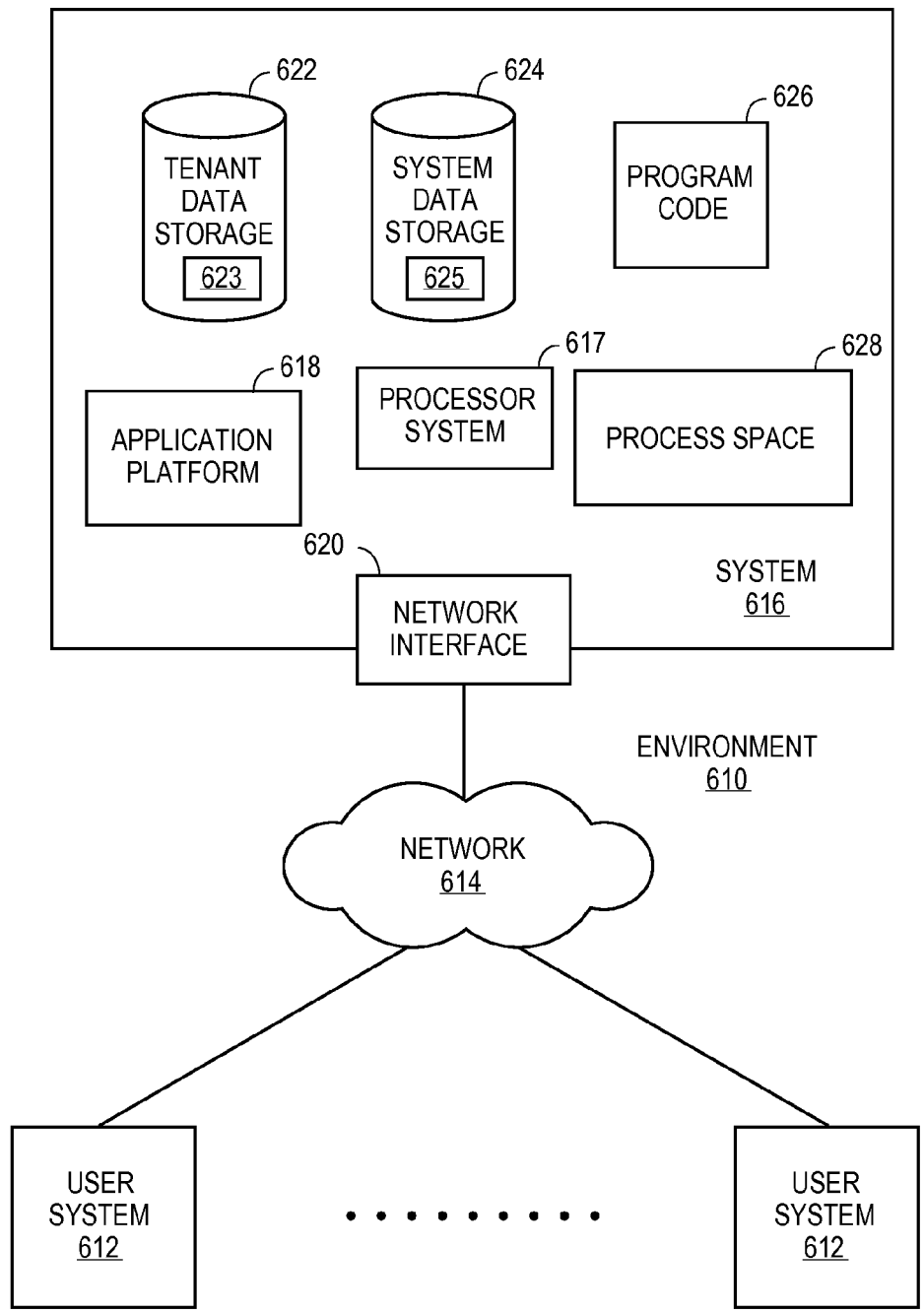
FIG. 6 is a block diagram of an environment where an on-demand database service might be used.

FIG. 6 is a block diagram of an environment where an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein.

A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator.

In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616.

Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, web pages and other information to and from user systems 612 and to store to, and retrieve from, a database system related data, objects, and Webpage content.

With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 16 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614.

Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units.

A computer program product embodiment includes a machine-readable storage medium (media) having instructions stored thereon/in which can be used to program a computer to perform any of the processes of the embodiments described herein. Computer code for operating and configuring system 616 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data.

Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide web pages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B).

As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
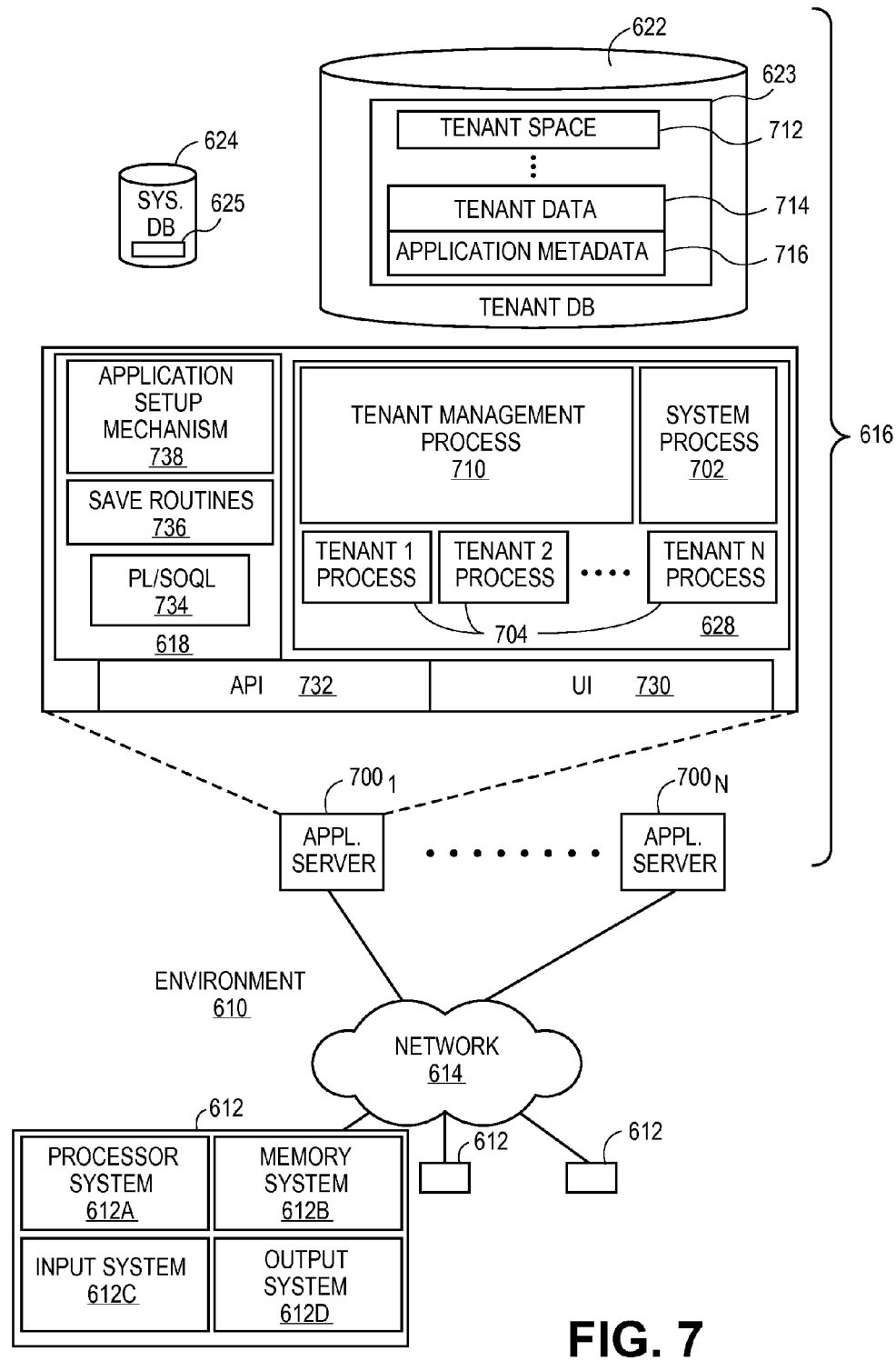
FIG. 7 is a block diagram of an environment where an on-demand database service might be used.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method for execution of code in a multitenant runtime environment, the method comprising:
   receiving a request to execute code corresponding to a tenant identifier (ID) in a multitenant database;
      wherein the multitenant database stores data for multiple client entities each identified by a tenant ID having one of one or more users associated with the tenant ID,
      wherein users of each of multiple client entities can only access data identified by a tenant ID associated with the respective client entity, and
      wherein the multitenant database is a hosted database provided by an entity separate from the client entities, and provides on-demand database service to the client entities;
   retrieving source code corresponding to the code to be executed from a multitenant database, wherein the source code is stored as an abstract syntax tree (AST) in a general-purpose distributed memory caching system;
   compiling the retrieved source code to generate executable code;
   translating the executable code to bytecode;
   parsing the bytecode to find a selected portion of the bytecode to service a request;
   executing the selected bytecode in the multitenant runtime environment;
   freeing memory used by the selected bytecode upon completion of the execution of the selected bytecode so that the selected bytecode is not preserved in the memory after execution of the bytecode.

2. The method of claim 1 wherein freeing the memory used by the selected bytecode in response to completion of the execution of the selected bytecode further comprises copying the selected bytecode to a first level cache memory.

3. The method of claim 2 further comprising copying the selected bytecode from the first level cache memory to a second level cache memory.

4. The method of claim 3 wherein the second level cache memory comprises memcached caching system.

5. The method of claim 2 further comprising:
   receiving a subsequent request to execute code corresponding to the selected bytecode stored in the first level cache memory;
   retrieving the selected bytecode from the first level cache memory;
   executing the selected bytecode in the multitenant runtime environment;
   freeing the memory used by the selected bytecode in response to completion of the execution of the selected bytecode.

6. The method of claim 1, wherein the multitenant runtime environment provides a round robin based load balancing strategy.

7. The method of claim 6 wherein the multitenant runtime environment comprises multiple server systems interconnected to receive requests from a load balancer providing the round robin based balancing strategy.

8. A system to provide a multitenant runtime environment for execution of code, the system comprising:
   a plurality of interconnected hardware server computing platforms;
   a load-balancing agent communicatively coupled with the plurality of server computing platforms, the load balancing agent to receive a request to execute code corresponding to a tenant identifier (ID) in a multitenant environment, the load balancing agent to allocate execution of the code to a selected one of the plurality of server computing platforms;
   a multitenant database communicatively coupled to the plurality of server computing platforms and the load-balancing agent wherein the multitenant database stores data for multiple client entities each identified by a tenant ID having one of one or more users associated with the tenant ID, wherein users of each of multiple client entities can only access data identified by a tenant ID associated with the respective client entity, and wherein the multitenant database is a hosted database provided by an entity separate from the client entities, and provides on-demand database service to the client entities;
   the selected server computing platform, in response to the allocation from the load-balancing agent, to retrieve source code corresponding to the code to be executed from a multitenant database, wherein the source code is stored as an abstract syntax tree (AST) in a general-purpose distributed memory caching system, to compile the retrieved source code to generate executable code, to translate the executable code to bytecode, to parse the bytecode to find a selected portion of the bytecode to service a request, to execute the selected bytecode in the multitenant runtime environment, and to free memory used by the selected bytecode upon completion of the execution of the selected bytecode so that the selected bytecode is not preserved in the memory after execution of the bytecode.

9. The system of claim 8 wherein freeing the memory used by the selected bytecode in response to completion of the execution of the selected bytecode further comprises the selected server computing platform copying the selected bytecode to a first level cache memory.

10. The system of claim 9 further comprising the selected server computing platform copying the selected bytecode from the first level cache memory to a second level cache memory.

11. The system of claim 10 wherein the second level cache memory comprises memcached caching system.

12. The system of claim 9 further, wherein the selected server computing platform further receives a subsequent request to execute code corresponding to the selected bytecode stored in the first level cache memory, retrieves the selected bytecode from the first level cache memory, executes the selected bytecode in the multitenant runtime environment, and frees the memory used by the selected bytecode in response to completion of the execution of the selected bytecode.

13. The system of claim 8, wherein the load-balancing agent provides a round robin based load balancing strategy.

14. An article of manufacture comprising a non-transitory computer-readable medium having stored thereon instructions to cause one or more processors to provide execution of code in a multitenant runtime environment, the instructions, when executed, causing the one or more processors to:

receive a request to execute code corresponding to a tenant identifier (ID) in a multitenant database;
wherein the multitenant database stores data for multiple client entities each identified by a tenant ID having one of one or more users associated with the tenant ID,
wherein users of each of multiple client entities can only access data identified by a tenant ID associated with the respective client entity, and
wherein the multitenant database is a hosted database provided by an entity separate from the client entities, and provides on-demand database service to the client entities;
retrieve source code corresponding to the code to be executed from a multitenant database, wherein the source code is stored as an abstract syntax tree (AST) in a general-purpose distributed memory caching system;
compile the retrieved source code to generate executable code;
translate the executable code to bytecode;
parse the bytecode to find a selected portion of the bytecode to service a request;
execute the selected bytecode in the multitenant runtime environment;
free memory used by the selected bytecode upon completion of the selected bytecode so that the selected bytecode is not preserved in the memory after execution of the bytecode.

15. The article of claim 14 wherein the instructions that cause the one or more processors to free the memory used by the selected bytecode in response to completion of the execution of the selected bytecode further comprise instructions that, when executed, cause the one or more processors to copy the selected bytecode to a first level cache memory.

16. The article of claim 15 further comprising instructions that, when executed, cause the one or more processors to copy the selected bytecode from the first level cache memory to a second level cache memory.

17. The article of claim 16 wherein the second level cache memory comprises memcached caching system.

18. The article of claim 15 further comprising instructions that, when executed, cause the one or more processors to:
receive a subsequent request to execute code corresponding to the selected bytecode stored in the first level cache memory;
retrieve the selected bytecode from the first level cache memory;
execute the selected bytecode in the multitenant runtime environment;
free the memory used by the selected bytecode in response to completion of the execution of the selected bytecode.

19. The article of claim 14, wherein the multitenant runtime environment provides a round robin based load balancing strategy.

20. The article of claim 19 wherein the multitenant runtime environment comprises multiple server systems interconnected to receive requests from a load balancer providing the round robin based balancing strategy.

21. A system to execute code in a multitenant runtime environment, the system comprising:
means for receiving a request to execute code corresponding to a tenant identifier (ID) in a multitenant database;
wherein the multitenant database stores data for multiple client entities each identified by a tenant ID having one of one or more users associated with the tenant ID,
wherein users of each of multiple client entities can only access data identified by a tenant ID associated with the respective client entity, and
wherein the multitenant database is a hosted database provided by an entity separate from the client entities, and provides on-demand database service to the client entities;
means for retrieving source code corresponding to the code to be executed from a multitenant database, wherein the source code is stored as an abstract syntax tree (AST) in a general-purpose distributed memory caching system;
means for compiling the retrieved source code to generate executable code;
means for translating the executable code to bytecode;
means for parsing the bytecode to find a selected portion of the bytecode to service a request;
means for executing the selected bytecode in the multitenant runtime environment;
means for freeing memory used by the selected bytecode upon completion of the selected bytecode so that the selected bytecode is not preserved in the memory after execution of the bytecode.

22. The system of claim 21 wherein the means for freeing the memory used by the selected bytecode in response to completion of the execution of the selected bytecode further comprise means for copying the selected bytecode to a first level cache memory.

23. The system of claim 22 further comprising means for copying the selected bytecode from the first level cache memory to a second level cache memory.

24. The system of claim 22 further comprising:
means for receiving a subsequent request to execute code corresponding to the selected bytecode stored in the first level cache memory;
means for retrieving the selected bytecode from the first level cache memory;
means for executing the selected bytecode in the multitenant runtime environment;
means for freeing the memory used by the selected bytecode in response to completion of the execution of the selected bytecode.

* * * * *